(12) United States Patent
Breunsbach et al.

(10) Patent No.: US 6,321,591 B1
(45) Date of Patent: Nov. 27, 2001

(54) METHOD AND APPARATUS FOR MEASURING SPRAY FROM A LIQUID DISPENSING SYSTEM

(75) Inventors: Rex L. Breunsbach, Clackamas; Paul M. Austen, Milwaukie, both of OR (US)

(73) Assignee: Electronic Controls Design, Inc., Milwaukie, OR (US)

( * ) Notice: Subject to any disclaimer, the term of this patent is extended or adjusted under 35 U.S.C. 154(b) by 0 days.

(21) Appl. No.: 09/255,374

(22) Filed: Feb. 22, 1999

(51) Int. Cl.[7] .............................. G01N 11/00; G06K 9/00; B05D 5/12
(52) U.S. Cl. .............................. 73/53.01; 427/8; 382/152
(58) Field of Search .............................. 73/53.01; 427/8, 427/9, 427, 212; 382/152; 428/403

(56) References Cited

U.S. PATENT DOCUMENTS

| | | | |
|---|---|---|---|
| 3,609,043 | * | 9/1971 | Simmons et al. ............ 356/335 |
| 3,981,264 | * | 9/1976 | Smith et al. ............ 346/33 R |
| 5,589,225 | * | 12/1996 | Yamada et al. ............ 427/212 |
| 5,701,156 | * | 12/1997 | Pierce ............ 348/86 |
| 5,811,187 | * | 9/1998 | Anderson et al. ............ 428/403 |
| 6,190,727 | * | 2/2001 | Thaggard ............ 427/9 |
| 6,265,017 | * | 7/2001 | Hogan et al. ............ 427/8 |

OTHER PUBLICATIONS

SonoFlux 9500, Spray Fluxing Systems brochure, 4 pages, Sep. 1995.

Ultrasonic Spray Nozzle Systems–When Precision Counts brochure, 5 pages, www.sono–tek.com/nozzles/main_nozzles.html, Jan. 27, 1999.

Ultrasonic Nozzles, Technology Overview, 4 pages, www.sono–tek.com/technology/main_tech.html, Jan. 27, 1999.

\* cited by examiner

*Primary Examiner*—Hezron Williams
*Assistant Examiner*—Jay L Politzer
(74) *Attorney, Agent, or Firm*—Klarquist Sparkman, LLP

(57) ABSTRACT

A system and method for measuring liquid from a liquid dispensing system is disclosed. In an illustrated application, a flux measuring device is described that measures flux dispensed from a flux applicator system. The flux measuring device is a test unit that simulates a printed circuit board. Once the distribution of flux is measured, different parameters in the flux applicator system can be modified to ensure that the proper distribution of flux is applied to printed circuit boards during their manufacture. In one aspect, a mesh board having substantially uniform thickness includes a plurality of spaced-apart holes that extend through the mesh board. The holes are sized so that liquid dispensed from a nozzle that contacts the bottom surface of the mesh board enters the holes and is detected on the top surface of the mesh board. A cover is mounted to the mesh board and uniformly maintains detection material in contact with the top surface of the mesh board. In another aspect, an image is formed on the detection material due to contact with liquid that passes through the holes in the mesh board. Image processing and analysis software may be used to automatically measure the image on the detection material. Based on the measurement, the liquid dispensed from the nozzle or other parameters in the manufacturing process can be modified.

24 Claims, 3 Drawing Sheets

METHOD AND APPARATUS FOR MEASURING SPRAY FROM A LIQUID DISPENSING SYSTEM

FIELD OF THE INVENTION

This invention generally pertains to test equipment for sensing, analyzing, and measuring spray from a liquid dispensing system, such as in the electronics industry. The invention finds particular application as a device for measuring the even distribution of flux dispensed from a flux applicator system.

BACKGROUND OF THE INVENTION

A printed circuit board (PCB) generally includes a multi-layered board having electronic components, such as chips, transistors, resistors, etc. mounted thereon. Conductive traces formed on the layers of the board connect the electronic components together to form an electronic circuit. The electronic components may be a surface-mount type where the legs of the components are mounted on top of conductive pads. Alternatively, the electronic components may be a through-hole type where legs of the components extend through vias (small holes) within the PCB.

Wave solder machines are used to mount the electronic components to the PCBs. The wave solder machines have multiple stages including a fluxing stage, a preheating stage, and a wave solder stage. The fluxing stage applies flux to the PCB, as further described below. The preheating stage raises the temperature of the PCB in preparation for soldering. And the wave solder stage applies solder to the PCB, thereby bonding the electronic components to the PCB.

Liquid dispensing systems are used during the fluxing stage of the wave solder machine. Before soldering the electronic components to the PCB, flux is applied to remove or facilitate removal of oxides from metal parts, such as the legs of the electronic components. The flux also prevents further oxidation of metals during soldering. Flux applicator systems are a particular type of liquid dispensing system wherein a reciprocating or fixed spray nozzle system ejects atomized flux in a precise pattern over an entire side of the PCB. The flux applicator systems typically are either an air-pressure type or an ultrasonic type. Both types of flux applicator systems have potential problems. The air pressure-type flux applicator systems generally produce a number of relatively large drops of flux traveling at high velocities. At least some of these high-velocity drops bounce off of the PCB, rather than settling on the desired surface. Ultrasonic-type flux applicator systems use high-frequency sound waves created by piezoelectric crystals. Liquid is introduced onto an atomizing surface through a feed tube and is directed toward the PCB by forced air. The vibrational amplitude of the atomizing surface is carefully controlled. If the amplitude is too high, a condition known as cavitation occurs where large droplets of fluid are ejected. If the amplitude is too low, the energy is insufficient to produce atomized drops.

Applying an even distribution of flux is important when producing the PCBs. If too little flux is applied to any portion, oxidation can occur during the soldering process. On the other hand, too much flux requires cleaning of the PCB, which can be expensive and slow the manufacturing process. For example, cleaning a PCB requires expensive cleaning equipment, disposal of chemical waste, and time for drying the PCBs. To ensure that an even distribution of flux is applied to the PCBs, a test PCB is traditionally is sent over the flux applicator system with thermal paper attached to the underside of the board, such as by taping. The thermal paper reacts with the flux sprayed from the flux applicator system causing the thermal paper to discolor. If the thermal paper is not completely discolored, then the flux is not being applied properly. The thermal paper may also be taped or otherwise placed on the topside of the PCB. Alternatively, cardboard may be sent through the flux applicator system to simulate a PCB. The cardboard discolors in spots where the flux is applied. Still further some companies run actual product through the wave solder machine and check if the product was properly produced. This typically requires scraping some of the product as adjustments are made to the flux applicator system.

This prior technique for testing the flux applicator system is problematic. First, the thermal paper can only detect if too little flux is applied, not if too much is applied. Additionally, the thermal paper does not adequately absorb flux well so the flux puddles and often smears before a technician can view an image formed on the thermal paper. Furthermore, the flux may be applied enough to discolor the thermal paper, but not enough to transfer through the vias in the PCB, as is needed to ensure proper soldering.

An object of the invention, therefore, is to provide a method and apparatus for accurately measuring the distribution of liquid dispensed from a liquid dispensing system.

SUMMARY OF THE INVENTION

The present invention is directed to a system and method for measuring liquid from a liquid dispensing system. In particular, the present invention is used to measure the uniformity of distribution of flux applied to PCBs in a wave solder machine. In the illustrated application, a flux measuring device is described that measures flux dispensed from a flux applicator system. The flux measuring device is a test unit that simulates a PCB. Once uniform distribution of flux is measured, different parameters in the flux applicator system can be modified to ensure that the proper flux is applied to PCBs during their manufacture.

In one aspect of the present invention, a mesh or perforate board or plate having substantially uniform thickness and sized to approximate the size of a PCB processed by the system includes a plurality of spaced-apart holes that extend through the mesh board. The holes are sized so that liquid dispensed from a nozzle that contacts the bottom surface of the mesh board enters the holes and is detected on the top surface of the mesh board. In other words, the mesh board helps to produce a visual representation of topside penetration by the flux. A cover on top of the mesh board maintains detection material uniformly in contact with the top surface of the mesh board.

In another aspect of the invention, an image is formed on the detection material due to contact with liquid that passes through the holes in the mesh board. Image processing and analysis software may be used to automatically measure whether there is a uniform distribution of flux on the detection material. Based on the measurement, the liquid dispensed from the nozzle or other parameters in the system can be modified.

Various advantages and features of novelty which characterize the invention are particularized in the claims forming a part hereof. However, for a better understanding of the invention and its advantages, refer to the drawings and the accompanying description in which there are illustrated different embodiments of the invention.

DETAILED DESCRIPTION OF THE ILLUSTRATED EMBODIMENTS

Figure 1:
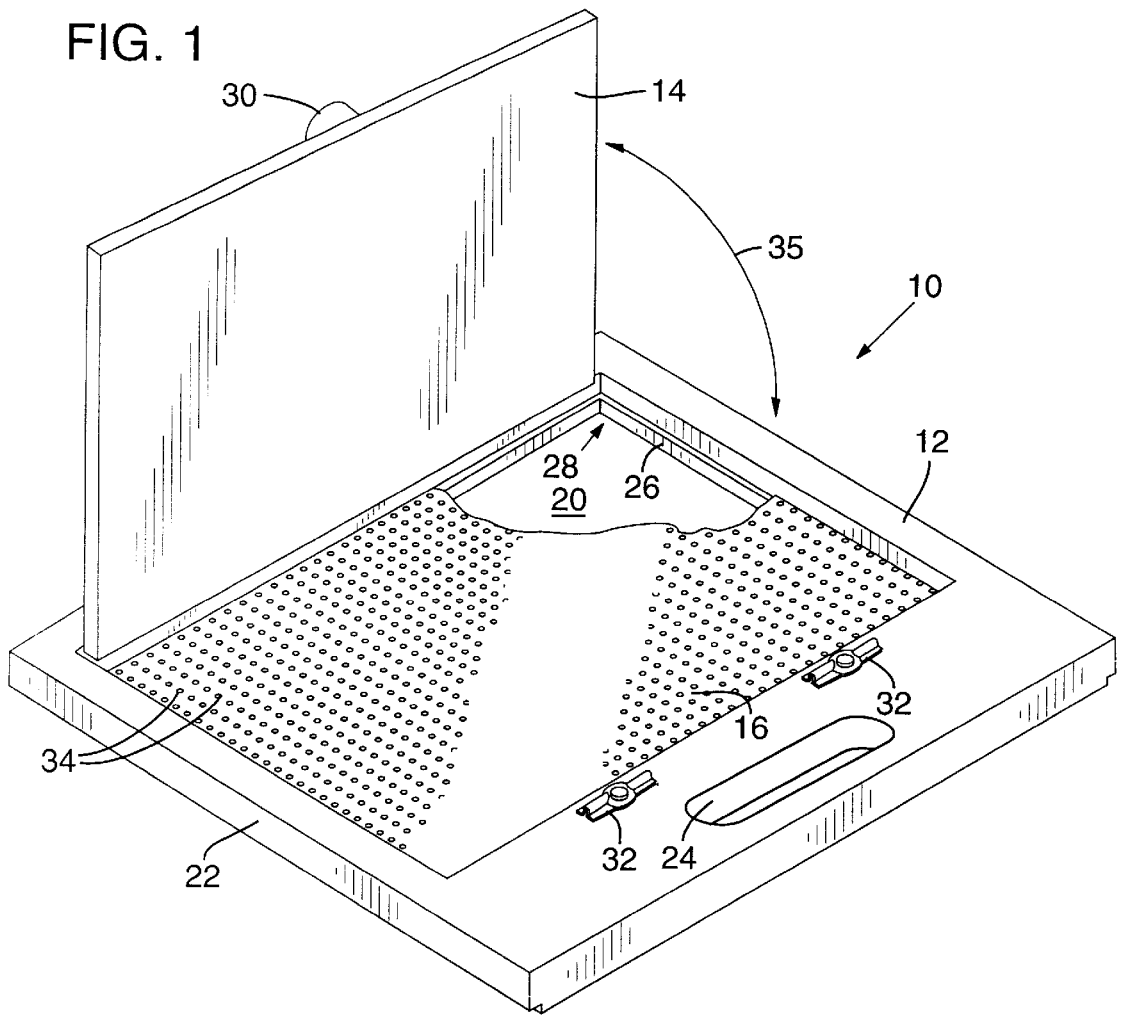
FIG. 1 is a perspective view of a flux measuring device according to the invention with a mounting frame, a cover in an open position, and a mesh board having spaced-apart holes extending therethrough.
Figure 2:
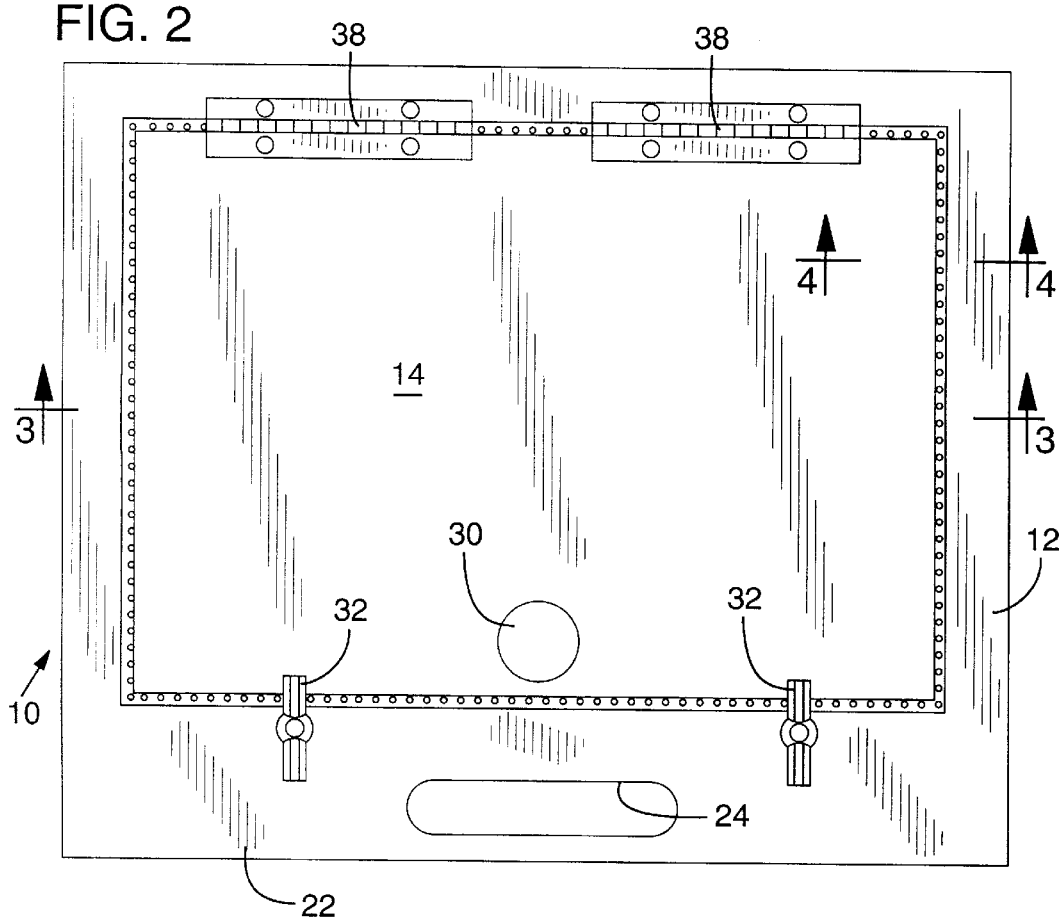
FIG. 2 is a top view of the flux measuring device of FIG. 1 with the cover in a closed position.

FIGS. 1 and 2 show a flux measuring device 10 according to the invention. The flux measuring device includes a frame 12, a cover 14, and a substantially rigid mesh or perforate board or plate 16. The frame 12 appears much like a picture frame in that it has four sections connected together to form a square shape with a large opening 20 through the center. A section 22 of the frame 12 has a hole 24 extending therethrough to form a handle for carrying the frame. The frame 12 includes an inner lip 26 formed on an inner surface 28 of the frame for mounting mesh board 16. A cover handle 30 (FIG. 2) is shown as a knob attached to the cover 14 so that the cover may be easily opened and the mesh board 16 may be easily removed from the frame 12. Two rotatable latches 32 are mounted to the frame to secure the cover in the closed position. The frame could be made from a variety of materials, such as medal, wood, fiberglass, ceramics, etc. Although the frame is shown as one monolithic piece, the frame could be made of separate pieces fastened together by screwing, gluing, etc.

The mesh board 16 is shown cut away to reveal the opening 20 in the frame. However, it is understood that the mesh board in its normal operative position is a similar shape to the frame (in this case square) and extends across the entirety of the opening 20. The mesh board 16 rests on the inner lip 26 and can be removed from the frame 12. The mesh board has a plurality of holes 34 extending therethrough that are aligned in rows and columns. The holes are sized to be similar to the size of vias in a printed circuit board. In the illustrated embodiment, the holes are of uniform size and distribution. However, the holes may also vary in size and distribution to adequately test how flux penetrates into different size holes, as is further described below. Additionally, the holes are shown such that the spacing therebetween is constant for all the holes, but the spacing between the holes can vary if desired. The mesh board is substantially flat and rigid, and has a thickness consistent with the thickness of a PCB (for example, approximately $\frac{1}{16}$ of an inch) so as to model the manufacturing process of PCBs. The thickness of the mesh board may change to more accurately model the spray dispensing system for the particular application. Additionally, the size of the holes may need to change based on the application. Of course, the size of the entire mesh board and supporting frame will change depending on the size of the PCB being simulated.

The mesh board may be made of any number of materials, such as G10 fiberglass luminate. The illustrated board has the holes spaced apart a distance of $\frac{1}{10}$ of an inch on center. The size of the holes in the illustrated board are 0.035.

The cover 14 is pivotably mounted to the top of the frame 12 as shown by arrow 35. The cover may be made from the same material as the frame or different materials. The cover is sized to be slightly smaller than the inner side 28 of the frame 12 so that it may rest on the mesh board 16 in the closed position. As further described below, detection paper is placed on the mesh board 16 and the cover acts to uniformly press or maintain the detection paper against the mesh board.

FIG. 2 shows a top view of the flux measuring device 10 with the cover 14 in a closed position. A pair of hinges 38 is used to secure the cover 14 to the frame 12 and allow the cover to open and close. Although hinges are shown in FIG. 2, the cover may be a separate piece that is placed on the mesh board 16 and locked into place by latches mounted on opposite sides of the frame 12. Other techniques may also be used to secure the cover to the mesh board. In any event, cover handle 30 allows the cover to be lifted when in the closed position.

Figure 3:
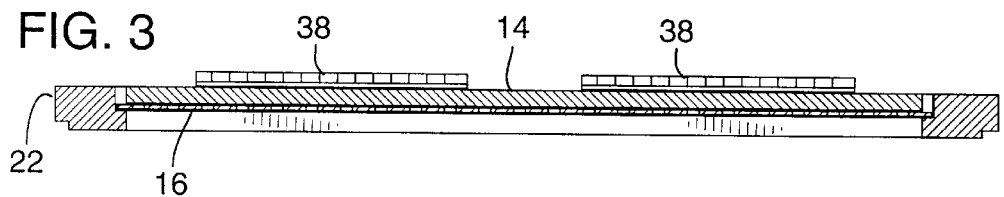
FIG. 3 is a cross-sectional view of the flux measuring device taken through lines 3—3 of FIG. 2 with the cover in a closed position and with detection paper positioned between the cover and the mesh board.
Figure 4:
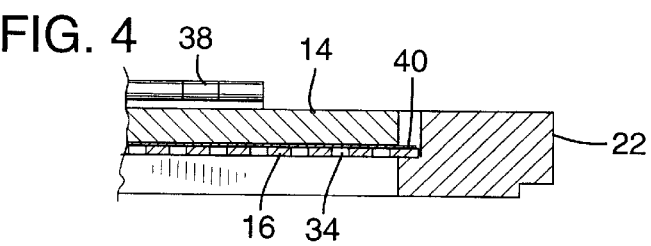
FIG. 4 is an enlarged cross-sectional view of the flux measuring device taken through lines 4—4 of FIG. 2.

FIGS. 3 and 4 show a cross-sectional view of the flux measuring device 10 through lines 3—3 and 4—4 of FIG. 2. Detection paper 40 is shown sandwiched between the cover 14 and the mesh board 16. The detection paper 40 may be a thermal paper that changes color when coming into contact with flux. Alternatively, other indicators, such as pH paper, litmus paper, Bromthymol Blue, chlorophenol red, etc., may be used. Thus, when the bottom of the mesh board is sprayed with flux (as further described below) the flux passes through the holes 34 and comes in contact with the detection paper 40 to provide an indication of whether the flux is being properly applied. The best results are obtained when the detection paper 40 is kept against the surface of the mesh board 16. The cover 14 uniformly presses against the detection paper 40 by either the weight of the cover or by latches 32 mounted to the frame that secure the cover in a closed position. In any event, the cover acts to uniformly maintain the detection paper 40 against the surface of the mesh board 16.

Figure 5:
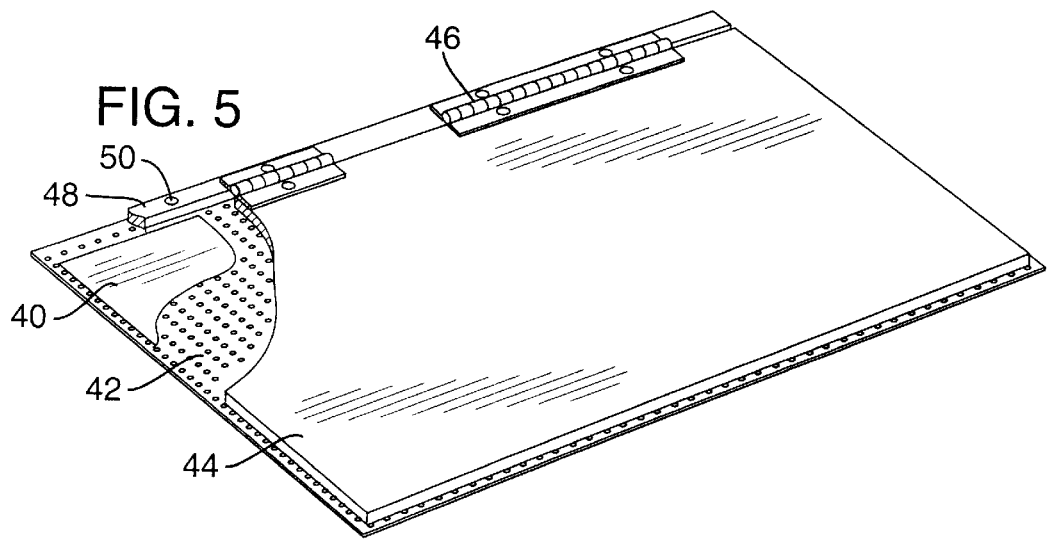
FIG. 5 is a perspective view of a second embodiment of the flux measuring device showing a cover directly mounted to the mesh board and partially cut away to show detection paper positioned between the cover and the mesh board.

FIG. 5 shows a second embodiment of the invention, wherein the frame 12 is eliminated. In this embodiment, a mesh board 42 similar to the mesh board 16 (described above) has a cover 44 mounted directly to it by hinges 46. A cover mounting member 48 is secured to the mesh board 42 by screws 50 and supports the hinges 46 so that the cover can pivotably open. The cover 44 is shown partially broken away to reveal detection paper 40 sandwiched between the cover and the mesh board. Instead of hinging the cover to the frame or mesh board, the cover could be removably clamped to either one.

Figure 6:
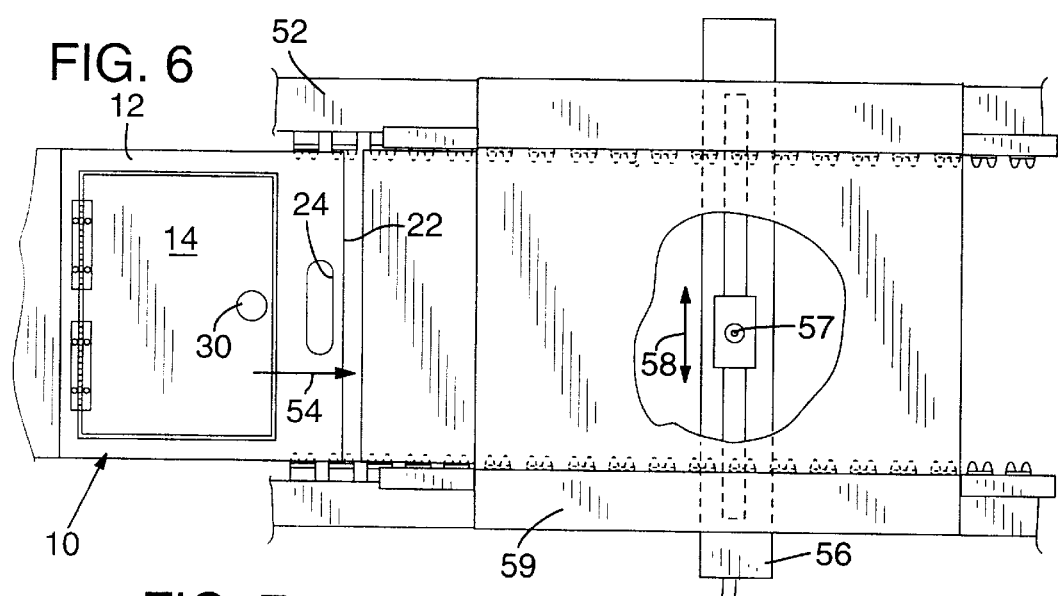
FIG. 6 shows a portion of a wave solder machine in operation with a mesh board being moved by a conveyor toward a reciprocating spray nozzle system.

FIG. 6 shows the flux measuring device 10 in operation. The flux measuring device rides on a conveyor 52 of a wave solder machine in a direction indicated by arrow 54. The conveyor 52 is a type typically used in the manufacture of printed circuit boards. The flux measuring device 10 is sized similar to a printed circuit board so as to simulate the manufacturing process. A spray nozzle system 56 including a spray nozzle 57 is positioned beneath the conveyor and automatically reciprocates back and forth in a direction perpendicular to the direction of the conveyor 52 as shown by arrow 58. (Other types of spray nozzle systems have the spray nozzle fixed.) A cover 59 is mounted to the conveyor to ensure that flux sprayed by the spray nozzle system 56 is maintained. The spray nozzle system is specially designed to spray flux used in the manufacture of printed circuit boards. The spray nozzle system may be a variety of types including an ultrasonic spray nozzle system or a pressure nozzle system. Other spray nozzle systems may also be used. The illustrated spray nozzle system may be purchased through a company called Sono-Tek located at Milton, N.Y.

The speed that the spray nozzle system 56 and conveyor 52 move contributes to how evenly the flux is dispensed on the flux measuring device. If the conveyer moves very slowly and the spray nozzle system 56 reciprocates very quickly, then a particular point on the bottom-side of the flux measuring device may be coated multiple times with flux. Conversely, if the spray nozzle system 56 moves very slowly and the conveyor 52 moves very quickly, then some portions of the flux measuring device may not be sprayed with any flux. Another variable is the pressure within the spray nozzle system that is used to dispense the flux. If too little flux is sprayed onto any point of the flux measuring device 10, then printed circuit boards during the manufacturing procedure may not have the proper distribution of flux necessary for soldering. Conversely, excessive flux dispensed from the spray nozzle system 56 is wasteful. Excess flux on a PCB requires the PCB to be cleaned or else the flux may cause damage to the PCB over time.

After the flux measuring device 10 passes over the spray nozzle system 56, flux from the spray nozzle system coats the bottom of the mesh board 16 and penetrates the holes 34 in the mesh board. Flux that comes in contact with the detection paper 40 will react with the detection paper causing discoloration. Thus, the detection paper serves as a measuring device to determine if the application of flux to the flux measuring device 10 is even and uniformly distributed across the bottom surface of the flux measuring device.

Figure 7:
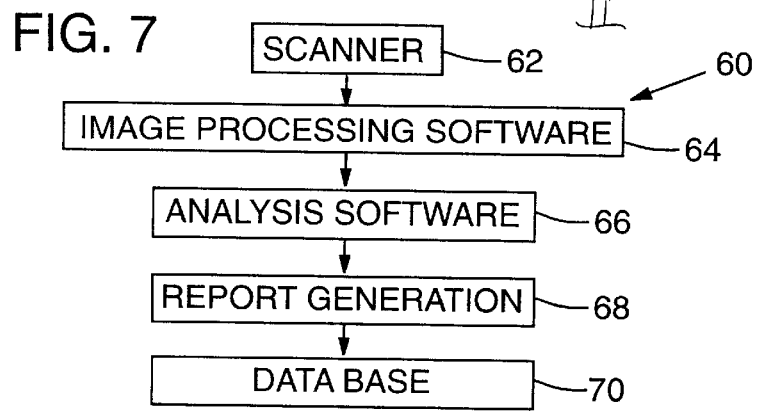
FIG. 7 shows an image processing system for measuring and analyzing the evenness and distribution of flux sprayed onto the detection paper.

FIG. 7 shows hardware and software needed to analyze the results obtained from the flux measuring device 10. The system 60 includes a scanner 62, image processing software 64, analysis software 66, report generation software 68 and a database 70. A technician removes the detection paper 40 from the flux measuring device 10 after it passes over the spray nozzle system 56, lets it dry, and places the detection paper on to the scanner 62. Image processing software 64 reads in the scanned image of the detection paper. Analysis software 66 then performs an analysis of whether the proper distribution of flux is being applied to the flux measuring device 10. The analysis software 66 can look at the size, shape, and color of the image on the detection paper to determine if an even distribution of flux is being applied. The speed of the conveyor and the spray nozzle system also can be modified to ensure an even distribution of flux is applied. Additionally, the pressure of the spray nozzle system can be modified. The analysis software 66 may also advise on adjustments that can be made to the speed of the conveyor 52, the speed of the spray nozzle system 56, or the pressure of the spray nozzle system. A technician can then adjust these different parameters to obtain an even distribution of flux. Alternatively, these adjustments may occur automatically. A variety of image processing 64 and analysis 66 software can be used for the invention. Such software is available from a company called Cognex Corporation of Natick, Mass. (www.cognex.com). Report generation software 68 allows a printout of the results obtained by the flux measuring device. Database 70 allows for saving of the results so that they may be compared to other previously saved results.

Having the described and illustrated the principles of our invention with reference to preferred embodiments thereof, it will be apparent that these embodiments can be modified in arrangement and detail without departing from the principles of the invention.

For example, although the illustrated flux measuring device is square, it may be any desired shape, such as circular, triangular, etc.

Still further, although the mesh board is shown as removable from the frame, the mesh board 16 may also be constructed with the frame so as to be permanently fixed therein. In such a case, the frame would not need the inner lip 26.

Still yet further, although specific examples of detection paper are described, other types of detection material may be used as is well known in the art. For example, water-sensitive paper that changes color when contacted with water or other liquid may be used.

Although a cover is shown for pressing the detection paper against the surface of the board, other techniques can be used for maintaining pressure on the paper. For example, an apparatus can be used for pressing the paper at predetermined points on the paper, as opposed to applying uniform pressure over a substantial portion of the surface of the paper.

The apparatus and method is shown for measuring the uniform distribution of flux on the detection paper. For example, if all dots formed on the paper are similar size and color, then the distribution is relatively uniform. The apparatus and method may also be used to determine an amount of flux by associating the color of the dots formed on the paper with an amount of flux.

In view of the wide variety of embodiments to which the principles of our invention can be applied, it should be apparent that the detailed embodiments are illustrative only and should not be taken as limiting the scope of this invention. Rather, we claim as our invention, all such embodiments as may come within the scope of the following claims and equivalence thereto:

What is claimed is:

1. An apparatus for measuring the distribution of liquid dispensed from a nozzle, comprising,
    a mesh board having substantially uniform thickness and having top and bottom surfaces, the mesh board further including a plurality of spaced-apart holes that extend through the mesh board, the holes being sized so that liquid dispensed from a nozzle that contacts one of the surfaces of the mesh board can enter the holes and be detected on the opposite surface of the mesh board; and
    a cover carried by the mesh board for overlying the opposite surface of the board, the cover having an open position enabling placement of detection paper on the opposite surface of the mesh board and a closed position for maintaining the detection paper in contact with the opposite surface of the mesh board.

2. The apparatus of claim 1 wherein the spaced-apart holes within the mesh board vary in size.

3. The apparatus of claim 1 wherein the spaced-apart holes within the mesh board are equal in size.

4. The apparatus of claim 1 wherein a substantial majority of the holes are equally spaced apart.

5. The apparatus of claim 1 wherein the spacing between holes varies.

6. The apparatus of claim 1 including a supporting frame mounting the mesh board in surrounding relationship to the board.

7. The apparatus of claim 6 wherein the cover is hingedly mounted to the frame.

8. The apparatus of claim 6 wherein the board is removably mounted in the frame.

9. The apparatus of claim 1 further including detection paper removably mounted between the mesh board and the cover, the detection paper visually changing color when contacting the liquid from the nozzle.

10. The apparatus of claim 6 further including at least one cover handle attached to the cover to facilitate removing the mesh board from the frame.

11. The apparatus of claim 1 further including a conveyor for transporting the mesh board in a first direction and a nozzle that moves in a second direction perpendicular to the first direction the conveyor moves, the nozzle for dispensing liquid.

12. The apparatus of claim 1 further including the nozzle wherein the nozzle is a flux applicator system for spraying flux used in the manufacture of printed circuit boards.

13. The apparatus of claim 12 wherein the flux applicator system is selected from a group consisting of an ultrasonic fluxer or an air pressure fluxer.

14. The apparatus of claim 1 further including image processing and analysis software for reading the distribution of liquid that contacted the detection paper.

15. The apparatus of claim 1 further including detection paper that chemically reacts when contacted by flux.

16. The apparatus of claim 1 wherein the mesh board's thickness is substantially equivalent to that of a printed circuit board.

17. A method for measuring the distribution of flux dispensed from a flux applicator system, the method comprising the steps of:
   providing a mesh board having top and bottom surfaces and a plurality of holes extending through the board between the top and bottom surfaces;
   placing detection material on the top surface of the mesh board so that the detection material covers a substantial portion of the holes;
   pressing the detection material against the top surface of the mesh board;
   while pressing the detection paper against the top surface, moving the mesh board over a flux applicator system and spraying flux on the bottom surface of the mesh board during such movements so that flux passes through the holes onto the detection material.

18. The method of claim 17 further including:
   removing the detection material from the mesh board; and
   reading an image formed on the detection material from contact with flux into image processing equipment.

19. The method of claim 18 further including automatically determining from the image a distribution of flux sprayed on the mesh board.

20. The method of claim 17 including sizing the mesh board to simulate a printed circuit board.

21. The method of claim 17 including sizing at least a portion of the holes in the mesh board to simulate vias in a printed circuit board.

22. A flux measuring device for measuring flux sprayed from a spray nozzle system, comprising:
   a mesh board having top and bottom surfaces and having holes spaced apart and extending therethrough;
   detection paper substantially coextensive with the mesh board that in operative position lies flat on the top surface of the mesh board to cover a majority of the holes in the mesh board;
   a cover substantially coextensive with the mesh board that in operative position presses the detection paper against the top surface of the mesh board;
   whereby the detection paper detects the distribution of flux that passes through the holes in the mesh board to the top surface of the mesh board when flux is sprayed upward against the bottom surface of the board passing over a flux spraying apparatus.

23. The flux measuring device of claim 22 further including:
   an image processing system for automatically reading the distribution and evenness of flux sprayed on the detection paper.

24. A flux measuring device, comprising:
   a rigid perforate plate sized to approximately the size of a printed circuit board, the plate having opposed first and second perforate surfaces;
   a frame for supporting the plate;
   a sheet mounting means connected to the frame for removably mounting a sheet of detection material against the first surface of the perforate plate wherein the second surface of the plate is to be sprayed by a flux spray system such that flux is sprayed through the holes in the plate onto the detection material.

* * * * *